May 5, 1964     C. W. CROWE ETAL     3,132,052
METHOD OF REMOVAL OF ORGANIC FOULING DEPOSITS EMPLOYING
NITROSYLSULFURIC ACID COMPOSITION
Filed Aug. 20, 1962
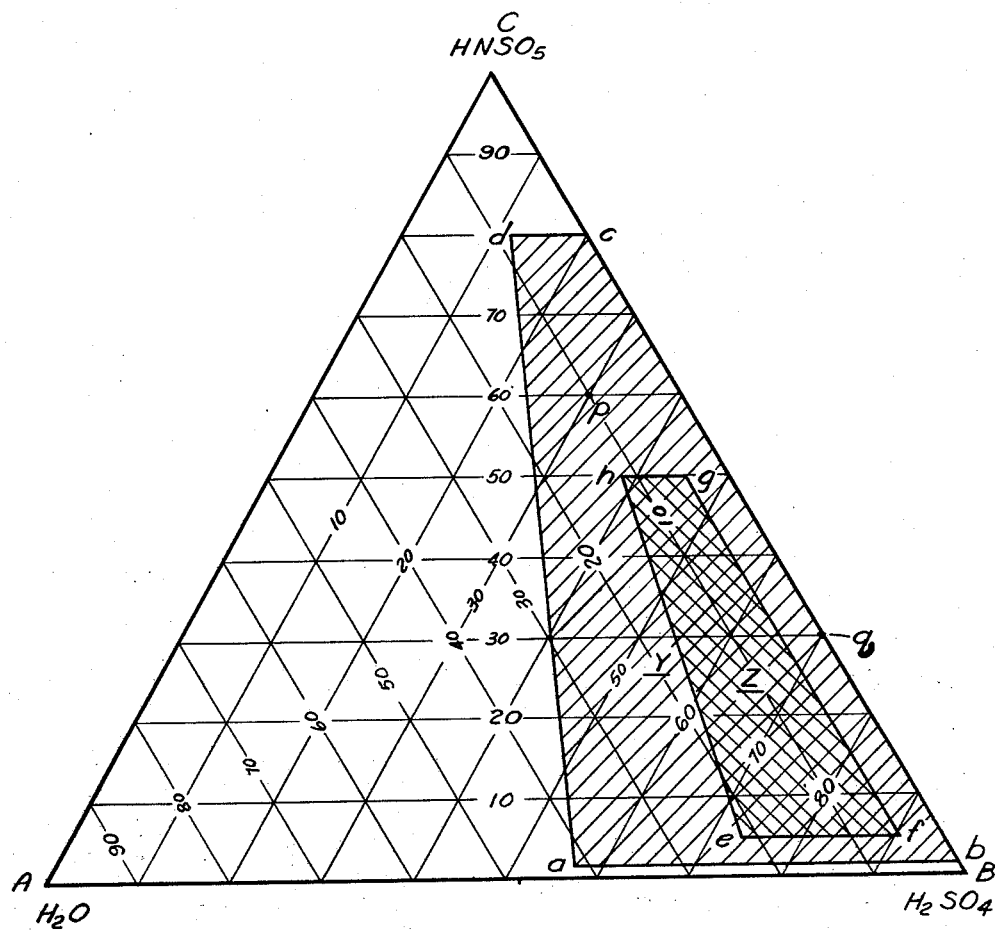
INVENTORS.
Curtis W. Crowe
Roger G. Duranleau
BY *CWCarlin*
ATTORNEY United States Patent Office 3,132,052
Patented May 5, 1964

3,132,052
METHOD OF REMOVAL OF ORGANIC FOULING DEPOSITS EMPLOYING NITROSYLSULFURIC ACID COMPOSITION
Curtis W. Crowe and Roger G. Duranleau, Tulsa, Okla., assignors to The Dow Chemical Company, Midland, Mich., a corporation of Delaware
Filed Aug. 20, 1962, Ser. No. 218,173
8 Claims. (Cl. 134—28)

The invention is directed toward the removal of organic deposits and mixed organic and inorganic deposits from the surfaces of deposition-susceptible structures which come into contact with fluids containing dispersed therein organic deposition-forming substances including those both in solution and suspension.

Organic deposits comprise carbonaceous and hydrocarbonaceous substances, including compounds of nitrogen, sulfur, oxygen, and the like. They contain varying amounts of entrapped and bonded inorganic materials such as silt, grit, and inorganic salts, prevalently the carbonate, sulfates, silicates, phosphates, and sulfides and the oxides and hydroxides of such metals as Mn, Mg, Ca, Fe, Cu, Zn, and to some extent K and Na.

The organic substances are usually of a very complex nature including coke bonded by various cementitious substances and various mixtures of tars, greases, asphalts, waxes, and a variety of organic compounds of the nature of carboxylic acids, esters, and resins and polymeric materials, some of which are of a long chain and often cross-linked nature.

The physical characteristics of the deposits vary widely including principally (1) substantially uniform semi-solid deposits, e.g., those of a waxy, tarry, or gummy type, (2) substantially uniform hard deposits some of which are flint-like or show a luster when fractured, and (3) particulate deposits comprising discrete particles cemented together, of varying degrees of hardness, and including both sticky and tarry types as well as substantially dry-non-sticky types.

Deposits which are especially resistant to removal from surfaces contacted by fluids carrying dispersed solids capable of forming such deposits are those which form on the walls of chemical processing equipment. The exact nature, extent of deposition, and adherence to the walls depend, as one would expect, on a number of factors among which are the nature of the contacting fluids, e.g., reactants, coolants, and the like employed, the temperature of the process, the design of the apparatus, and upon the fluctuations in temperature and changes, if any, in the concentrations and type of materials which come in contact with the surfaces upon which the deposition is formed.

Certain coke-containing deposits have more or less resisted known practical methods of removal. Likewise certain highly polymerized deposits have also largely resisted all known practical methods of removing them, i.e., although methods of removing them may be known, such methods are not adaptable to general use in industrial cleaning operations.

Illustrative of processes, during which persistently adherent and unusually corrosive and fouling organic deposits are formed, are refining, cracking, and treating of petroleum and petroleum products, due in part to varying degrees of degradation, recombining, and molecular growth which accompanies pyrolitic and adiabatic conditions.

Efforts have been directed toward providing a method of removing organic deposits of the nature above suggested. Although some methods (as aforesaid) have been conceived and tried which employ materials that exhibit some dislodging effect on organic deposits of this nature, they have been unacceptable, usually primarily because they are objectionably corrosive to the material out of which the fluid-contacting structural parts are made or because they produce noxious or explosive materials in situ.

A need, therefore, continues to exist for an effective and safe method of removing deposits comprising organic materials from the surfaces of structural members which come in contact with fluids containing materials which tend to form such deposits.

The invention provides a method of solubilizing, disintegrating, and removing adhering deposits comprising organic materials from surfaces, that have come in contact with fluids containing suspended or dissolved substances susceptable of deposition on contacting surfaces, which consists essentially of dissolving between about 1.5 and about 80 weight percent of nitrosylsulfuric acid (hereinafter usually referred to as $HNSO_5$), or a sufficient amount of nitrosylsulfuric acid anhydride (and the necessary water for reaction with the anhydride) to provide the required percent of the acid, in concentrated sulfuric acid, or in an aqueous solution of sulfuric acid, at a temperature sufficiently high for all the nitrosylsulfuric acid to dissolve, the amount of water present being insufficient to hydrolyze the nitrosylsulfuric acid to too great an extent, to make a solvent composition; bringing the composition so made into contact with the adhering organic deposits sought to be removed from the surface to solubilize the deposits; and thereafter removing the so used solvent composition containing solubilized deposits in solution or suspension from the immediate vicinity of said surfaces.

The melting point of nitrosylsulfuric acid, at atmospheric pressure, is 163° F. Below that temperature, the solubility thereof in aqueous $H_2SO_4$ is limited, gradually increasing at higher temperatures and higher concentrations of $H_2SO_4$. Table I below sets out maximum solubilities of nitrosylsulfuric acid in increasingly concentrated aqueous solutions of $H_2SO_4$ at representative temperatures below the melting point of the nitrosylsulfuric acid, i.e., below 163° F.

TABLE I

Solubility of Nitrosylsulfuric Acid in Grams Per 100 Grams of Aqueous Sulfuric Acid Solutions at Different Temperatures

| Percent $H_2SO_4$ | 32° F. | 68.9° F. | 99.1° F. | 121.3° F. |
|---|---|---|---|---|
| 56.7 | (*) | 19.3 | 29.9 | 35.6 |
| 62.1 | 11.9 | 22.6 | 34.3 | 39.3 |
| 73.1 | 17.3 | 27.0 | 39.4 | 46.0 |
| 74.9 | 19.7 | 31.4 | 40.8 | 46.2 |
| 84.1 | 30.5 | 42.4 | 50.2 | 56.5 |
| 90.4 | 35.1 | 49.2 | 58.5 | 61.6 |
| 99.8 | (*) | 62.0 | 66.1 | 67.8 |

*Not determined.

Above 163° F., the three components, viz., the nitrosylsulfuric acid, sulfuric acid, and water, are completely miscible in all proportions, and accordingly, the relative proportions of the components are not in any way limited by solubilities.

The temperature employed in the practice of the invention may be from room temperature to any temperature which is practical provided, as aforesaid, at a temperature below 163° F. that an amount of nitrosylsulfuric acid is employed that is soluble at such lower temperature said, at unusually high temperatures that the apparatus and facilities available are capable of withstanding the temperature employed. In practice, temperatures of between about 100° and 400° F. and more commonly between about 190° and 300° F. are usually employed. The time of treatment varies with conditions, any time between 0.5 and 24 hours may be used, from 4 or 5 to 8 or 10 hours usually being employed.

The relative amounts of the constituents: nitrosylsulfuric acid and sulfuric acid, with or without water, to employ are conveniently represented by the triangular graph of the annexed drawing.

In the drawing, the triangle is equilateral and the full perpendicular distance from a side to the opposite corner or apex represents 100% of one of the constituents. As shown, apex A represents 100% of $H_2O$, apex B 100% of $H_2SO_4$, and apex C 100% of $HNSO_5$. The relative amounts of each of the constituents or any mixture of the three of them is ascertained by reading the perpendicular distances from each of the three sides of the triangle to the point representing the composition. For example, the point $p$ represents a mixture consisting of 10% of $H_2O$, 30% of $H_2SO_4$, and 60% of $HNSO_5$. The relative amounts of the two constituents $H_2SO_4$ and $HNSO_5$, when employed without water, are represented by points along the side BC. For example, the relative amounts of $H_2SO_4$ and $HNSO_5$, represented by the point $q$, are ascertained by reading the perpendicular distance from the side AC to $q$, i.e., 70% $H_2SO_4$, and the perpendicular distance from the side AB to $q$, i.e., 30% $HNSO_5$, respectively.

Proportions over which effective cleaning action can generally be expected are represented by the area Y bounded by the lines abcd. The preferred proportions are represented by the area Z (lying wholly within area Y) bounded by the lines, efgh.

The maximum percent of $HNSO_5$ recommended to employ in the practice of the invention, as defined by the upper boundary dc of area Y on the graph, is 80% because the solubility of the deposits is markedly decreased at concentrations above this percentage and because such higher concentrations are more difficult to handle since solidification takes place when cooled below 163° C. The minimum recommended percent of 1.5% $HNSO_5$, as shown on the graph by the lower boundary ab of area Y, is based on the discovery that the solvent composition having a $HNSO_5$ content below 1.5% showed definite corrosive tendencies when maintained in contact with mild steel.

The preferred upper limit of $HNSO_5$ to employ, as defined by the upper boundary gh of the area Z on the graph is set at 50% because it was found that the solubility of most deposits shows a measurable decrease as the nitrosylsulfuric acid proportion is increased above about 40% and such decreased solubility becomes more pronounced at concentrations above about 50%. The lower limit of the preferred percent of nitrosylsulfuric acid, shown at 5%, the lower boundary ef of the area Z, is based largely upon a desired safe percent above the minimum 1.5% (the lower boundary ab of area Y) because, in use, the $HNSO_5$ concentration has a tendency to drop on occasion as much as 2 to 3% and, hence, if less than 5% were employed, it might well fall to below the somewhat critical lower limit of 1.5%.

As shown on the graph, a binary composition consisting of only $HNSO_5$ and $H_2SO_4$ is acceptable for carrying out the practice of the invention. However, for both practical reasons and for reasons of preferred operability, cleaning operations are usually carried out, according to the invention, by employing a composition containing some water. This is based, from a practical viewpoint, on the fact that $H_2SO_4$ is hygroscopic and can be retained substantially water-free only by the exercise of exacting precautions. It is based, from a preferred mode of operation viewpoint, on the fact that the presence of some water improves the efficacy of the composition for use in the invention.

The permissible ratio of $H_2SO_4$ to water to employ with the $HNSO_5$, as shown by area Y on the graph, is based upon a number of considerations. For example, when the ratio of $H_2SO_4/H_2O$ is so high that little or no water is present, as aforesaid, the solubilizing effects of the composition lessen. When the ratio of $H_2SO_4/H_2O$ falls below certain ascertained critical values, two undesirable effects are noticed: (1) the corrosivity of the solvent composition on metal in contact therewith increases and (2) excessive hydrolysis of the $HNSO_5$ occurs. Accordingly, experimental evaluations have been made and the limiting boundary ad of area Y of the graph, defining the maximum percents of $H_2SO_4$ and $H_2O$ to employ, has been established by the findings of such evaluations.

Although any ratio of $H_2SO_4$ to $H_2O$ resulting from a percent of each found within area Y may be employed, the ratio resulting from percents of each falling within area Z have been found preferable.

As subsequently shown, it has also been found that a percent of water between about 10% and 20% (see Tables IV and VI infra) results in less corrosivity than percentages of water either below or above that range.

A particularly desirable feature of the invention is that it provides its own metal passivity when used on iron or steel. This is apparently brought about by the formation of a dense film of ferric sulfate on the surface of the metal. A discovery associated with the passivity inherent in the practice of the invention is that such passivity appears more quickly at somewhat elevated temperatures and, more slowly at such low temperatures as room temperature.

The preferred practice of the invention, therefore, where corrosivity of the metal is a consideration, is to carry out the treatment at elevated temperatures such as between about 200° and 300° F. Temperatures between about 190° and 350° F. have been found fully satisfactory.

A series of tests to demonstrate the method of the invention was run employing the required solubilizing composition containing varying percentages of the components on various deposits formed in industrial units. The identification of the deposits, conditions of the tests, and the results thereof on the deposits are shown in Table II. Both the observed disintegration and percent dissolution of the deposits are shown. It is of importance to bear in mind that substantial disintegration, wherein the deposit is solubilized and loses its adhesive and cohesive character sufficiently to be carried along in pieces and chunks, is often as effective and (to the extent that less solvent as a carrying medium may be necessary) is often more desirable than where complete dissolution occurs. Accordingly, there is not necessarily a close correlation between the percent by weight of deposit dissolved and the extent of disintegration of the deposit.

TABLE II

*Scale Solubility Tests With Solutions of Nitrosylsulfuric Acid in Aqueous Sulfuric Acid*

| Identification of deposit | Test conditions | | Solvent composition, percent by wt. | | | Percent by wt. of deposit dissolved | Observed disintegration of deposit |
|---|---|---|---|---|---|---|---|
| | Temp. in °F. | Time in hours | HNSO$_5$ | H$_2$SO$_4$ | H$_2$O | | |
| A | 200 | 24 | 20 | 77 | 3 | 5 | Good. |
| B | 260 | 24 | 20 | 77 | 3 | 100 | Complete. |
| B | 200 | 6 | 20 | 77 | 3 | 100 | Do. |
| C | 200 | 24 | 20 | 77 | 3 | 2 | Good. |
| D | 265 | 24 | 20 | 77 | 3 | None | None. |
| E | 260 | 24 | 20 | 77 | 3 | None | Poor. |
| F | 260 | 24 | 20 | 77 | 3 | 33 | Fair. |
| G | 260 | 24 | 20 | 77 | 3 | 100 | Complete. |
| G | 220 | 6 | 20 | 77 | 3 | 100 | Do. |
| H | 260 | 10 | 20 | 75 | 5 | 96 | Good. |
| J | 240 | 18 | 20 | 75 | 5 | 83 | Poor. |
| J | 240 | 18 | 20 | 70 | 10 | 95 | Do. |
| J | 240 | 18 | 20 | 65 | 15 | 100 | Complete. |
| J | 240 | 18 | 10 | 85 | 5 | 63 | Poor. |
| J | 240 | 18 | 10 | 80 | 10 | 66 | Do. |
| J | 240 | 18 | 10 | 75 | 15 | 70 | Do. |
| K | 200 | 20 | 20 | 75 | 5 | 76 | Good |
| K | 200 | 20 | 20 | 70 | 10 | 81 | Do. |
| K | 200 | 20 | 20 | 65 | 15 | 81 | Do. |
| K | 200 | 20 | 10 | 85 | 5 | 72 | Fair |
| K | 200 | 20 | 10 | 80 | 10 | 76 | Good |
| K | 200 | 20 | 10 | 75 | 15 | 83 | Do. |
| L | 260 | 4 | 20 | 75 | 5 | 92 | Do. |
| L | 260 | 4 | 20 | 70 | 10 | 50 | Do. |
| L | 260 | 4 | 20 | 65 | 15 | 58 | Poor. |
| L | 260 | 4 | 10 | 85 | 5 | 37 | Good. |
| L | 260 | 4 | 10 | 80 | 10 | 24 | Do. |
| M | 230 | 3 | 20 | 75 | 5 | 71 | Do. |
| M | 230 | 3 | 20 | 70 | 10 | 85 | Do. |
| M | 230 | 3 | 20 | 65 | 15 | 87 | Do. |
| M | 230 | 3 | 10 | 85 | 5 | 13 | Do. |
| M | 230 | 3 | 10 | 80 | 10 | 68 | Do. |
| M | 230 | 3 | 10 | 75 | 15 | 83 | Do. |

A. Porous, black scale formed on bubble caps in a petroleum refinery distillation tower. Maximum percent capable of removal by ignition was 63%; maximum solubility previously reported employing known dissolving solvents was only 35%.

B. Hard, white, porous sheet of cross-linked latex polymer. No satisfactory solvent previously known.

C. One large chunk of hard, black colored material, 2 to 5 inches thick, resulting from asphalt feed stock, resembling hardened tar.

D. Section of ¾ inch I. D. tube of a heat exchanger containing a 2-4 mm. thick hard, dense, coke-like black deposit, from a hydrocarbon feed, on the interior surface. Maximum capable of removal was 89.6%.

E. Hard, black colored chunks, 1½ inches to 3 inches thick from a crude coke fractionating column. Scale thickness in trays reported to be up to 6 inches. Maximum capable of removal by ignition was 71.9%.

F. Hard, dense, black chunks removed from 30-inch overhead tar line in oil refinery. (Deposit had been previously found to be uneffected by attempts to remove it by pyrolysis due to its failure to support combustion.)

G. Hardened, white to gray colored chunks from a latex stock, up to 1 inch thick. Scale thickness is reported as 2½ inches.

H. Large chunk of black, rubbery deposit, comprising butadiene-styrene copolymer, from a reboiler on a heat exchange unit.

J. Light yellow to brown rubbery material reported to be 1 inch thick on coils inside of vessels apparently with a high polymer of butadiene-styrene.

K. Furfural polymer black material removed from raschig rings. (No solvent previously known was effective in removal of this material.)

L. Brittle, shiny black colored asphalt-like chunks from a 3-inch oxidizer unit having a density less than water. The scale in unit is reported as 8 to 12 inches with a total of between 1 and 3 tons.

M. Very hard, black deposit formed on raschig rings located in a furfural vaporizing tower. The material adheres very tenaciously to the metal raschig rings in large quantities.

Reference to Table II shows the efficacy of the method of the invention wherein all the deposits obtained from industrial process units tested were effectively dissolved and/or disintegrated with the exception of deposits identified as D and E. These deposits which more or less resisted removal, were glossy black and relatively light in weight indicating a high percentage of graphitized carbon which can be substantially all removed by ignition.

Tests were run to determine the corrosivity of the nitrosylsulfuric acid composition employed in the practice of the invention on various materials. The composition employed in these tests consisted of 20% nitrosylsulfuric acid, 77% sulfuric acid, and 3% water. The metals upon which the corrosivity was ascertained are set out in Table III below, together with the corrosion rate in pound per square foot per day.

TABLE III

*Corrosion Rates on Various Metals by a Solution of 20% Nitrosylsulfuric Acid, 3% Water, and 77% Sulfuric Acid*

Test conditions: time, 6 hrs.; temperature, 200° F.; corrosion rate, lb./ft.$^2$/day

| Metal: | |
|---|---|
| AISI 1010 Steel | .0261 |
| AISI 1010 Steel [1] | .0254 |
| AISI 405 Stainless | .0034 |
| AISI 410 Stainless | .0028 |
| AISI 304 Stainless | .0023 |
| Cast iron | .0024 |
| Chrome Moly (9% Cr, 1% Mo, balance chiefly iron) | .0049 |
| Monel | .1766 |
| Copper | .0326 |
| Cupro nickel (90–10) | .0553 |
| Cupro nickel (80–20) | .1745 |
| Cupro nickel (70–30) | .1545 |
| Admiralty | .2894 |

[1] 3 gm. of deposit identified as C in footnote of Table III, was adhered thereto.

Corrosion rates, as shown in Table III, were especially low for stainless steel, chrome-molybdenum alloy, and cast iron and were fully acceptable for mild steel and copper. However, it is to be observed that the rate of corrosion in some instances, might be found objectionable for use on certain grades of Monel metal, copper-nickel alloys, and admiralty metal.

To show the corrosivity effects of the solvent composition used in practice of the invention on mild steel, a series of tests was run wherein the percentage composition was changed. Tables IV, V, and VI, below, set out the weight percents of the solvent compositions comprising nitrosylsulfuric acid and water (balance H$_2$SO$_4$) which were maintained in contact with AISI 1010 Steel for six hours and the rate of corrosion of the steel in pounds per square foot per day at 100° F. (Table IV), 200° F. (Table V) and 300° F. (Table VI) ascertained.

TABLE IV

*Corrosion of AISI 1010 Steel by Solutions of Sulfuric Acid Containing Various Amounts of Nitrosylsulfuric Acid and Water*

[Test Conditions; Time 6 hrs.; Temperature, 100° F.]

| Percent HNSO$_5$ | Percent H$_2$O | Corrosion rate, lb./ft.$^2$/day |
|---|---|---|
| 5 | 5.0 | .0399 |
| 5 | 10.0 | .0150 |
| 5 | 15.0 | .0048 |
| 5 | 20.0 | .0037 |
| 5 | 22.5 | .1605 |
| 5 | 25.0 | .6386 |
| 10 | 5.0 | .0543 |
| 10 | 10.0 | .0139 |
| 10 | 15.0 | .0085 |
| 10 | 17.5 | .0071 |
| 10 | 20.0 | .0073 |
| 10 | 23.0 | .5956 |
| 20 | 5.4 | .0650 |
| 20 | 10.0 | .0219 |
| 20 | 14.7 | .0113 |
| 20 | 17.1 | .1479 |
| 20 | 19.5 | 2.3000 |

TABLE V

*Corrosion of AISI 1010 Steel by Solution of Sulfuric Acid Containing Various Amounts of Nitrosylsulfuric Acid and Water*

[Test Conditions; Time 6 hrs.; Temperature, 200° F.]

| Percent $HNSO_5$ | Percent $H_2O$ | Corrosion rate, lb./ft.²/day |
|---|---|---|
| 5 | 5.0 | .0136 |
| 5 | 10.0 | .0081 |
| 5 | 15.0 | .0050 |
| 5 | 20.0 | .0075 |
| 5 | 22.5 | .0130 |
| 5 | 25.0 | .0518 |
| 10 | 5.0 | .0142 |
| 10 | 10.0 | .0096 |
| 10 | 15.0 | .0077 |
| 10 | 17.5 | .0066 |
| 10 | 20.0 | .0059 |
| 10 | 23.0 | .0691 |
| 20 | 2.0 | .0289 |
| 20 | 3.9 | .0190 |
| 20 | 5.4 | .0169 |
| 20 | 7.4 | .0108 |
| 20 | 10.0 | .0068 |
| 20 | 14.7 | .0034 |
| 20 | 17.1 | .0073 |
| 20 | 19.5 | .3186 |

TABLE VI

*Corrosion of AISI 1010 Steel by Solutions of Sulfuric Acid Containing Various Amounts of Nitrosylsulfuric Acid and Water*

[Test Conditions; Time 6 hrs.; Temperature, 300° F.]

| Percent $HNSO_5$ | Percent $H_2O$ | Corrosion rate, lb./ft.²/day |
|---|---|---|
| 5 | 5.0 | .0079 |
| 5 | 10.0 | .0194 |
| 5 | 15.0 | .0381 |
| 5 | 20.0 | .0078 |
| 5 | 25.0 | .0309 |
| 5 | 30.0 | .2695 |
| 10 | 5.0 | .0127 |
| 10 | 10.0 | .0371 |
| 10 | 15.0 | .0157 |
| 10 | 20.0 | .0219 |
| 10 | 25.0 | .0201 |
| 10 | 30.0 | .0663 |
| 20 | 5.0 | .0137 |
| 20 | 10.0 | .0095 |
| 20 | 15.0 | .0070 |
| 20 | 17.5 | .0090 |
| 20 | 20.0 | .0101 |

Reference to Tables IV, V, and VI shows that at any of the three temperatures employed, less corrosion occurs when the water is composed of between 10% and 20% of the composition by weight. Further reference to the tables shows that corrosivity, in general, increases somewhat when both the percent of water and the percent of nitrosylsulfuric acid increases from about 10 to 20% but that such increase in corrosivity is more pronounced at 100° F. than at 200° F. and more pronounced at 200° F. than at 300° F., thereby indicating the advisability of carrying out the practice of the invention at least at about 200° F.

The following example is illustrative of a way of carrying out the invention to remove organic deposits from the inner surfaces of chemical processing equipment:

1000 gallons of a solvent composition consisting of 10% nitrosylsulfuric acid, 80% sulfuric acid, and 10% water is made up. A suggested way (although only one of many ways) of preparing 1000 gallons of the solvent composition of this proportion is to dissolve 173 gallons of a commercially available material (having a density of 1.94 grams/cc.) consisting by weight of 40% nitrosylsulfuric acid, 54% sulfuric acid and 6% water in 1731 gallons of 95% by weight sulfuric acid and then to add slowly the composition so made to 96 additional gallons of water. The order of addition of the ingredients is not highly critical but from the standpoint of safety it is preferable to add the sulfuric acid or the more concentrated aqueous solution thereof to the water or the less concentrated solution thereof.

The solvent thus made is then pumped into the unit to be cleaned using conventional pumping techniques. A suggested temperature to employ is between 200° and 250° F., e.g., about 220° F. The solvent composition at this temperature is maintained in contact with the deposit-coated walls as, for example, by circulating when coils, pipes or the like are being treated, for from about 4 to 8, 10, or more hours, about 5 or 6 hours being usually quite satisfactory. The so used solvent composition containing dissolved and/or suspended deposit material is then drained or pumped from the unit and to a disposal pit or the like provided for the purpose. The unit thus treated is then flushed with water, usually at least two times. Preferably the flush water contains an inhibitor for the purpose of inhibiting corrosion caused by any residual acid. An inhibitor to corrosion commonly employed for such purpose is an organic nitrogen compound preferably an aromatic or heterocyclic nitrogen base as employed in U.S. Patent 2,606,873. A typical inhibited flush may be illustrated by a solution of 2 gallons of such nitrogen base, e.g., pyridine, a mono- or dialkylaniline, a lutidine, a collidine, lepidine, quinoline, quinaldine, or acridine in sufficient water to make a thousand gallons of flushing liquid. At least one of the liquid flushes, preferably the last one employed, may be made slightly alkaline if desired as by dissolving some NaOH or $Na_2CO_3$ in the water. It is desirable that the unit then be blown dry with a substantially inert gas, nitrogen usually being employed. The unit is then ready for service.

Having described our invention, what we claim and desire to protect by Letters Patent is:

1. A method of solubilizing, disintegrating, and removing at least a portion of a deposit comprising an organic material from deposition-susceptible surfaces consisting essentially of dissolving a nitrosyl compound selected from the class consisting of nitrosylsulfuric acid and nitrosylsulfuric acid anhydride, sufficient to provide in the presence of water the equivalent amount of nitrosylsulfuric acid, in a liquid medium selected from the class consisting of sulfuric acid and aqueous sulfuric acid solutions in an amount of each of said nitrosylsulfuric acid, sulfuric acid, and water, defined by any point falling within the area designated Y on the graph constituting the annexed drawing, at a temperature sufficiently high to insure substantially complete dissolution of the amount of nitrosylsulfuric acid employed to make a solvent composition; forcing the solvent composition so made into contact with said deposit; maintaining contact between the solvent composition and deposit until a substantial portion thereof has been solubilized and disintegrated; and removing the so used solvent composition containing the thus solubilized and disintegrated deposit from the immediate vicinity of said surfaces.

2. The method according to claim 1 wherein the amounts of nitrosylsulfuric acid, sulfuric acid, and water are those defined by area Z on the graph constituting the annexed drawing.

3. The method according to claim 1 wherein the step comprising contacting said deposits with said solvent composition is followed by the step of flushing the thus treated surfaces with water at least once.

4. The method according to claim 3 wherein the water employed during flushing contains an inhibitor to acid corrosion of metals.

5. The method according to claim 4 wherein the inhibitor is a cyclic organic nitrogen base.

6. The method according to claim 3 wherein at least one flushing water is made alkaline by admixture therewith of an alkali metal compound selected from the class consisting of the hydroxides and carbonates thereof.

7. The method according to claim 2 wherein said solvent composition is circulated in contact with said deposit for at least about 0.5 hour.

8. The method according to claim 1 wherein the temperature of said solvent composition is maintained while in contact with said deposits at a temperature above 163° F.

References Cited in the file of this patent

UNITED STATES PATENTS

| | | |
|---|---|---|
| 2,081,168 | DeMering | May 25, 1937 |
| 2,403,613 | Reynolds et al. | July 9, 1946 |
| 2,643,205 | Murray | June 23, 1953 |
| 2,698,781 | Meyer | Jan. 4, 1955 |
| 2,820,729 | Davis | Jan. 21, 1958 |